(12) United States Patent
Tamaru et al.

(10) Patent No.: US 11,025,839 B2
(45) Date of Patent: Jun. 1, 2021

(54) CAMERA APPARATUS AND CAPTURING CONTROL METHOD OF CAMERA APPARATUS

(71) Applicant: PANASONIC I-PRO SENSING SOLUTIONS CO., LTD., Fukuoka (JP)

(72) Inventors: Tatsuya Tamaru, Fukuoka (JP); Jun Ikeda, Fukuoka (JP); Kazuhiko Nakamura, Fukuoka (JP); Satoshi Kataoka, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/745,069

(22) Filed: Jan. 16, 2020

(65) Prior Publication Data

US 2020/0236305 A1    Jul. 23, 2020

(30) Foreign Application Priority Data

Jan. 18, 2019   (JP) ............................. JP2019-007252

(51) Int. Cl.
*H04N 5/33* (2006.01)
*G02B 5/20* (2006.01)
(Continued)

(52) U.S. Cl.
CPC ............. *H04N 5/33* (2013.01); *G02B 5/208* (2013.01); *H04N 5/2256* (2013.01); *H04N 5/23212* (2013.01); *H04N 5/23245* (2013.01)

(58) Field of Classification Search
CPC .... H04N 5/33; H04N 5/2256; H04N 5/23212; H04N 5/23245; G02B 5/208
(Continued)

(56) References Cited

U.S. PATENT DOCUMENTS 9,113,094 B2   8/2015  Takahashi et al.
10,587,785 B2   3/2020  Kawashima et al.
(Continued)

FOREIGN PATENT DOCUMENTS

JP   2017-191212 A   10/2017
JP   2018-138988 A    9/2018

OTHER PUBLICATIONS

U.S. Appl. No. 16/745,832 to Tatsuya Tamaru et al., filed Jan. 17, 2020.
(Continued)

*Primary Examiner* — Behrooz M Senfi
(74) *Attorney, Agent, or Firm* — Greenblum & Bernstein, P.L.C.

(57) ABSTRACT

There is provided a camera apparatus including: a capturing unit that includes a lens to which light, from a capturing area including IR light and visible light is incident, and that performs capturing based on the light; an IR lighting unit that irradiates the capturing area with IR light; and a controller that generates an instruction to change a focal position of the lens and an instruction to adjust a quantity of the IR light, in which the controller calculates an IR light ratio which indicates a ratio of the quantity of the IR light to the light included in a captured image of the capturing area, and selects and performs any one of a first focusing processing to change the focal position of the lens corresponding to the IR light, a second focusing processing to change the focal position of the lens corresponding to the visible light, and an IR light quantity adjustment determination processing to determine whether or not to adjust the quantity of the IR light, based on the IR light ratio.

8 Claims, 6 Drawing Sheets

(51) Int. Cl.
*H04N 5/225* (2006.01)
*H04N 5/232* (2006.01)

(58) Field of Classification Search
USPC .......................................................... 348/164
See application file for complete search history.

(56) References Cited

U.S. PATENT DOCUMENTS

2017/0374282 A1* 12/2017 Naruse .................. G03B 15/00
2018/0180841 A1* 6/2018 Fransson ................ G02B 7/365
2019/0191129 A1 6/2019 Nakano et al.

OTHER PUBLICATIONS

U.S. Appl. No. 16/523,604 to Yuma Kobayashi et al., filed Jul. 26, 2019.

* cited by examiner

CAMERA APPARATUS AND CAPTURING CONTROL METHOD OF CAMERA APPARATUS

BACKGROUND OF THE INVENTION

1. Field of the Invention

The present disclosure relates to a camera apparatus and a capturing control method of the camera apparatus.

2. Background Art

Japanese Patent Publication No. 2018-138988 A discloses a method for adjusting a focus of a surveillance camera which surveils a scene and is capable of operating in a daytime mode and a nighttime mode. For example, in the surveillance camera, a daytime photographing mode operates in a state in which an IR cut-off filter is inserted into a photographing optical path, and a nighttime photographing mode operates in a state in which the IR cut-off filter retreats out of the photographing optical path. In addition, a process for daytime mode focus adjustment or nighttime mode focus adjustment is selected based on any of the daytime photographing mode or the nighttime photographing mode.

In a configuration of the above-described Japanese Patent Publication No. 2018-138988 A, capturing is performed while the daytime mode and the nighttime mode are automatically switched according to a level of a quantity of light in a scene. Therefore, in a case of focus adjustment (that is, focusing of a lens) during the capturing, it is not taken into consideration that a focal position of the lens is adjusted while taking a wavelength of light, which exists in the scene, into consideration. For example, in a case where visible light and IR light simultaneously exist in a scene where a light source, such as a street lamp using LED lighting, exists, the focus adjustment is performed with respect to an entire captured image in any of the daytime mode or the nighttime mode based on the level of the quantity of light of the scene in the method disclosed in Japanese Patent Publication No. 2018-138988 A. Therefore, in a case where a part where a visible light component is dominant and a part where an IR light component is dominant are mixed in the entire captured image, it is not possible to appropriately perform the focus adjustment in the entire captured image, and thus there is a possibility that focusing of the captured image is shifted.

Here, it is known that, since a wavelength band of the visible light is different from a wavelength band of the IR light, a focusing position (in other words, focal distance) of a lens differs, as a characteristic of the lens. Considering the characteristic of the lens, in a case where only focusing processing in accordance with alternative one light is performed in, for example, a scene in which the above-described visible light and the IR light are mixed in nighttime or the like, it is not possible to perform the focusing processing in accordance with another light, thereby generating deterioration of image quality in the captured image due to focus blur.

SUMMARY OF THE INVENTION

The present disclosure is proposed in consideration of the above-described conventional circumstances, and an object of the present disclosure is to provide a camera apparatus and a capturing control method of the camera apparatus which is capable of preventing the deterioration of the image quality due to the focus blur and maintaining the stable image quality even in a case where the visible light and the IR light simultaneously exist in the same scene.

According to an aspect of the present disclosure, there is provided a camera apparatus including: a capturing unit that includes a lens to which light, from a capturing area including IR light and visible light is incident, and that performs capturing based on the light, an IR lighting unit that irradiates the capturing area with IR light; and a controller that generates an instruction to change a focal position of the lens and an instruction to adjust a quantity of the IR light, in which the controller calculates an IR light ratio which indicates a ratio of the quantity of the IR light to the light included in a captured image of the capturing area, selects and performs any one of a first focusing processing to change the focal position of the lens corresponding to the IR light, a second focusing processing to change the focal position of the lens corresponding to the visible light, and an IR light quantity adjustment determination processing to determine whether or not to adjust the quantity of the IR light, based on the IR light ratio, and adjusts the quantity of the IR light and re-calculates the IR light ratio according to a determination that it is possible to increase or decrease the quantity of the IR light in a case where the IR light quantity adjustment determination processing is selected.

In addition, according to another aspect of the present disclosure, there is provided a capturing control method implemented by a camera apparatus including a lens to which light, from a capturing area including IR light and visible light, is incident, the method including: irradiating the capturing area with IR light, performing capturing based on the light, calculating an IR light ratio which indicates a ratio of a quantity of the IR light to the light, included in a captured image of the capturing area, selecting and performing any one of a first focusing processing to change a focal position of the lens corresponding to the IR light, a second focusing processing to change the focal position of the lens corresponding to the visible light, and an IR light quantity adjustment determination processing to determine whether or not to adjust the quantity of the IR light, based on the IR light ratio, and adjusting the quantity of the IR light and re-calculating the IR light ratio according to a determination that it is possible to increase or decrease the quantity of the IR light in a case where the IR light quantity adjustment determination processing is selected.

According to the present disclosure, it is possible to maintain the stable image quality by preventing the deterioration of the image quality due to the focus blur even in the case where the visible light and the IR light simultaneously exist in the same scene.

DETAILED DESCRIPTION OF THE EXEMPLARY EMBODIMENT

Hereinafter, a detailed embodiment, which discloses a camera apparatus and a capturing control method of the camera apparatus according to the present disclosure, will be described in detail with reference to the accompanying drawings. There is a case where unnecessarily detailed description is not performed. For example, there is a case where detailed description of already well-known items or repeated description with respect to substantially the same configuration is not performed. The reason for this is to avoid unnecessarily redundancy of description below, thereby making those skilled in the art easily understand. The accompanying drawings and the description below are provided such that those skilled in the art sufficiently understand the present disclosure, and do not intend to limit subjects in the claims.

First Embodiment

Figure 1:
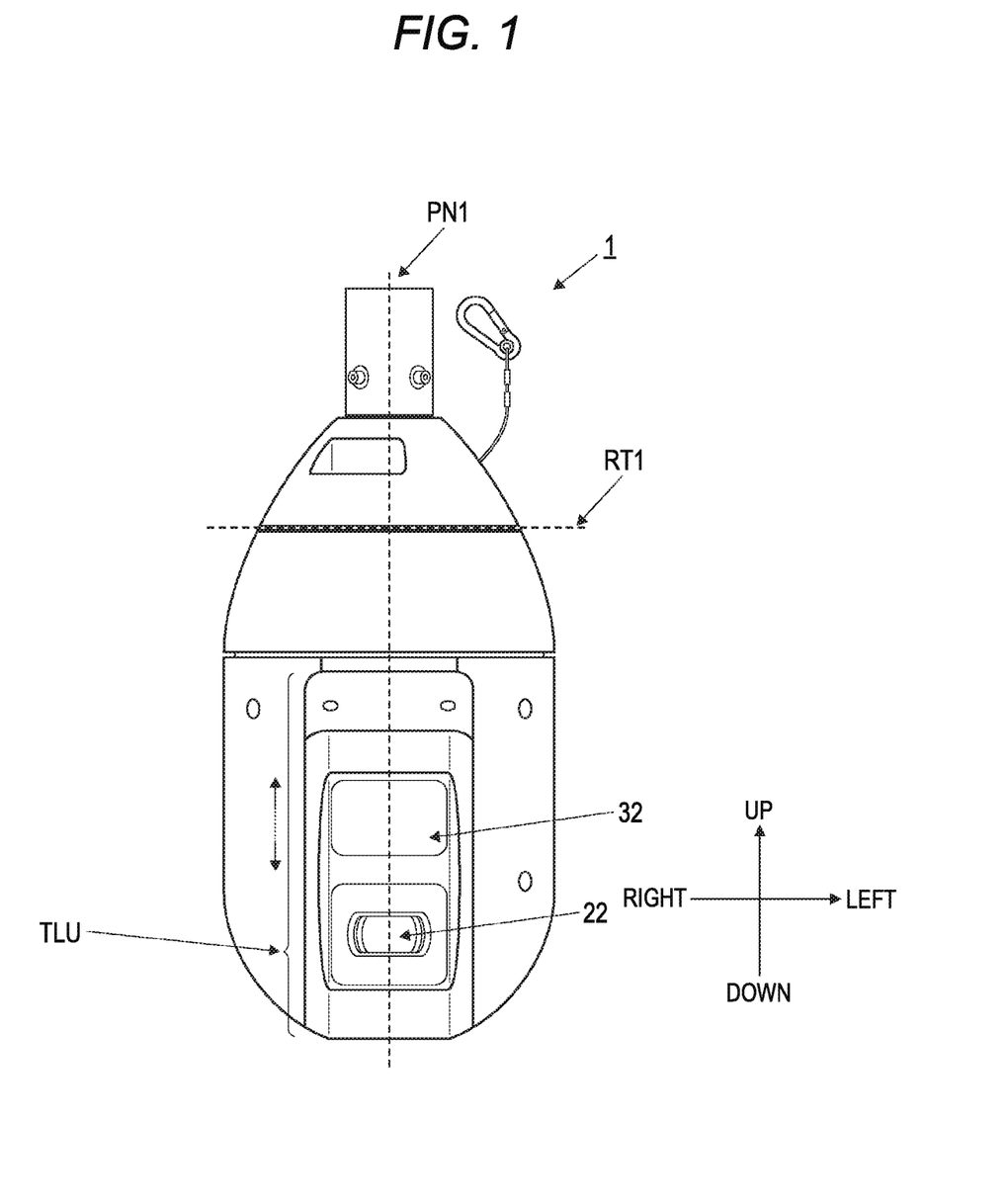
FIG. 1 is a diagram illustrating an external appearance of a camera.

An external appearance of a camera 1 according to a first embodiment and an internal configuration of the camera 1 will be described with reference to FIG. 1. FIG. 1 is a diagram illustrating the external appearance of the camera 1. In the specification, vertical and horizontal directions of the camera 1 conform to arrows illustrated in FIG. 1, and a front direction of paper is a front and a depth direction of the paper is a back.

The camera 1 is a camera apparatus which is usable regardless of indoor and outdoor, and includes, for example, a surveillance camera or a conference camera. The camera 1 is used while being fixed to and being hung by, for example, an external wall of a building, a ceiling, or the like, or is used to be relocatable on a desk by removing a partial component (a coupling component of an attachment surface of the external wall, the ceiling, or the like) and replacing the partial component with another component. In addition, although an internal configuration will be described in detail later, the camera 1 includes a lens 22 and a plurality of IR-LEDs 32.

The camera 1 is a Pan Tilt zoom (PTZ) camera which is capable of performing pan rotation, tilt rotation, and zoom process. The camera 1 is capable of changing a capturing area (in other words, changing an optical axis direction of the lens 22) by performing the pan rotation and the tilt rotation on the lens 22 and the IR-LED 32, and is capable of capturing in all directions. For example, the camera 1 is capable of performing the pan rotation by turning a housing, which is on a lower side than a pan rotation surface RT1, of the camera 1 to left and right along a pan rotation axis PN1 which is parallel to a vertical direction. In other words, the housing, which is on an upper side than the pan rotation surface RT1 of the camera 1, of the camera 1 does not turn because of being fixed to a flat attached surface. In addition, for example, the camera 1 is capable of performing the tilt rotation on a tilt unit TLU, which includes the lens 22 and the IR-LED 32 integrally, by 90° from a former direction to a lower direction along a tilt rotation axis (not illustrated in the drawing). An angle, at which the tilt rotation of the tilt unit TLU is possible, is not limited to 90°.

Light from the capturing area is incident to the lens 22, and the lens 22 forms an image on an image sensor 24 which will be described later. In the description below, an area which is a capturing target of the camera 1 is referred to be as the capturing area. In a case of the surveillance camera in which the camera 1 is used for a purpose of surveillance, the capturing area may be referred to as a surveillance area. The lens 22 includes lenses corresponding to a plurality of optical components such as a focal lens capable of adjusting a focal distance and a zoom lens capable of changing a zoom magnification.

The IR-LED 32 is an IR lighting which irradiates an inside of the capturing area with IR light, and is capable of adjusting a quantity of the IR light on the inside of the capturing area using a control unit 11 (refer to FIG. 2) and an IR-LED control unit 31 which are built in the camera 1 as controllers. In addition, the IR-LED 32 includes a plurality of IR lightings having respectively different irradiation distances or irradiation ranges (irradiation angles), and is capable of adjusting a state of the capturing target on the inside of the capturing area, a type of the IR lighting used through an external operation, the number of IR lightings, and the quantity of light. The IR-LED 32 is an example of the IR lighting which includes the IR light, and is not limited to the LED lighting.

Figure 2:
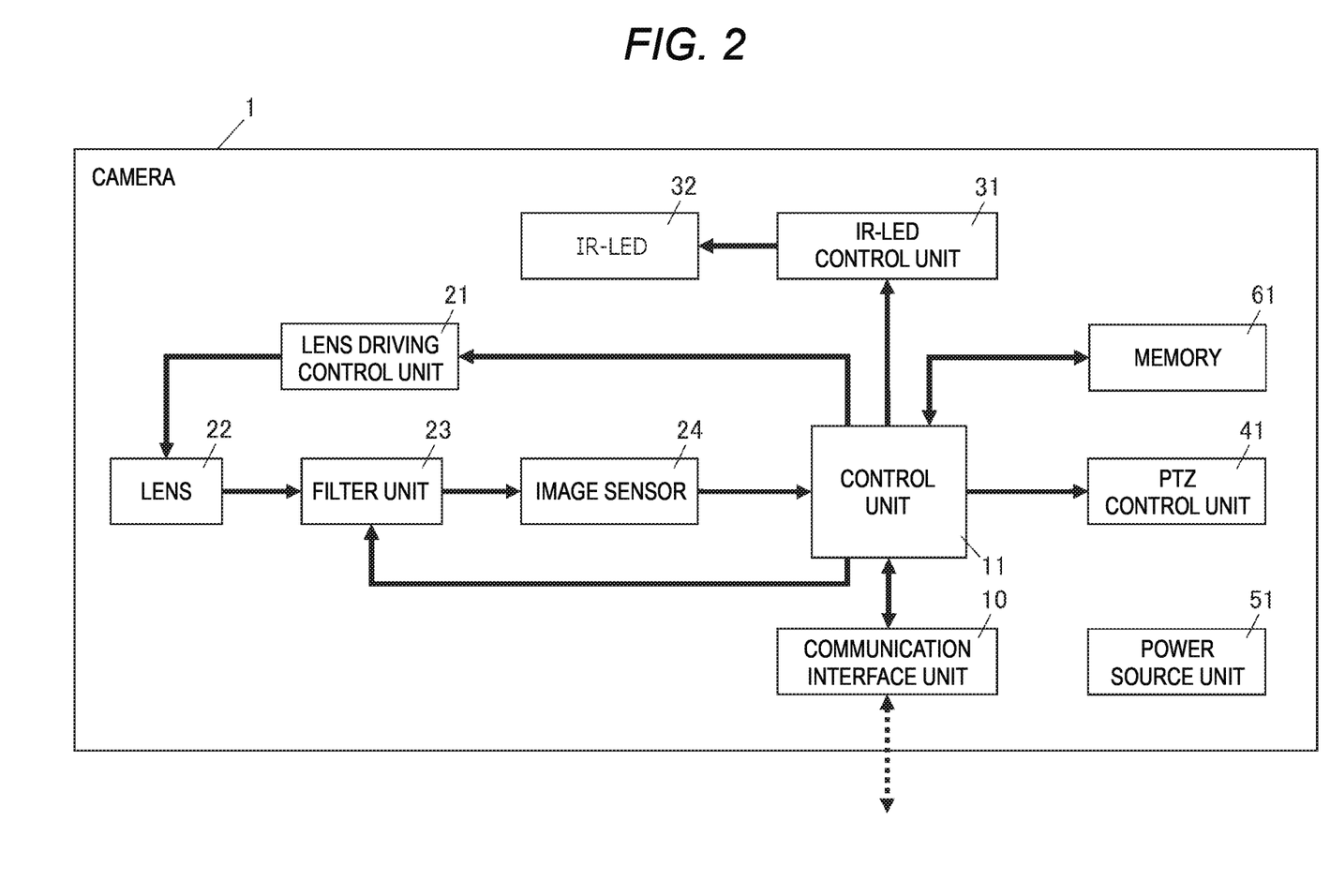
FIG. 2 is a diagram illustrating an inner configuration of the camera.

FIG. 2 is a diagram illustrating an inner configuration of the camera 1. The camera 1 includes a communication interface unit 10, the control unit 11, a lens driving control unit 21, the lens 22, a filter unit 23, the image sensor 24, the IR-LED control unit 31, the IR-LED 32, a PTZ control unit 41, a power source unit 51, and a memory 61.

The communication interface unit 10 includes a communication circuit for transmitting and receiving data or information to and from a network (not illustrated in the drawing), such as an intranet or the Internet, to which the camera 1 is connected. The communication interface unit 10 transmits and receives the data or the information to and from an external terminal (for example, a Personal Computer (PC) or the like) and another camera (not illustrated in the drawing) which are connected to the above-described network.

The control unit 11 as an example of the controller includes a Central Processing Unit (CPU), a Digital Signal Processor (DSP), or a Field Programmable Gate Array (FPGA). The control unit 11 functions as the controller which performs an operation of the camera 1, and performs a control process for totally generalizing operations of the respective units of the camera 1, a data input/output process between the respective units of the camera 1, a data computation (calculation) process, and a data storage process. The control unit 11 operates according to a program and data stored in the memory 61. The control unit 11 uses the memory 61 in a case of being operated, and stores data generated by the control unit 11 in the memory 61.

The memory 61 includes a Random Access Memory (RAM) and a Read Only Memory (ROM), and temporarily maintains a program and data, which are necessary to perform the operation of the camera 1, and, furthermore, information, data, or the like which is generated during the operation. The RAM is a work memory which is used, for example, in a case where the control unit 11 operates. For example, the ROM previously stores the program and the data for controlling the control unit 11.

In addition, the control unit 11 is capable of instructing the PTZ control unit 41 to change a posture of the camera 1 (in other words, the optical axis direction of the built-in lens 22) according to at least one of the pan rotation and the tilt rotation. In addition, the control unit 11 is capable of instructing the lens driving control unit 21 to change the zoom magnification of the lens 22 according to the zoom process. The PTZ control unit 41 performs well-known PTZ control according to an instruction from the control unit 11.

The PTZ control is performed by an external operation through the control unit 11 and the communication interface unit 10.

The control unit 11 reads and acquires parameters (for example, the amount of pan rotation, the amount of tilt rotation, and the zoom magnification) corresponding to one or more fixed preset positions from the memory 61. The control unit 11 is capable of instructing the PTZ control unit 41 to change the posture and the zoom magnification of the camera 1 by performing at least one of the pan rotation, the tilt rotation, and the zoom process such that the optical axis faces any of the preset positions. The control unit 11 generates a control signal, which includes the parameters, such as the amount of pan rotation, the amount of tilt rotation, and the zoom magnification, for the PTZ control, and transmits the control signal to the PTZ control unit 41. The PTZ control unit 41 performs at least one of the pan rotation, the tilt rotation, and the zoom process based on the control signal from the control unit 11.

In addition, the control unit 11 instructs to perform focus control of the lens 22 according to a captured image of the capturing area, which is the capturing target of the camera 1, or a state (environment) of the capturing area. For example, the control unit 11 transmits an instruction to perform adaptive focusing processing of changing the focal position of the lens 22, which is suitable for capturing the capturing area, to the lens driving control unit 21 according to the captured image which is output from the image sensor 24.

In addition, the control unit 11 instructs the IR-LED control unit 31, which changes the quantity of the IR light (for example, a quantity of current according to the quantity of the IR light to be supplied to the IR-LED 32) irradiated from the IR-LED 32, to change the quantity of current to be supplied to the IR-LED 32.

In addition, the control unit 11 outputs control information for controlling the quantity of the IR light, which is irradiated from the IR-LED 32, to the IR-LED control unit 31. The IR-LED control unit 31 controls and supplies a value of current corresponding to the control information from the control unit 11 to each of the plurality of IR-LEDs 32, and adjusts a total quantity of light of the IR-LEDs 32 which irradiate the capturing area with the IR light. The IR-LED 32 is an example of the IR lighting which includes the IR light, and is not limited to the LED lighting. Furthermore, the plurality of IR lightings include the respectively different irradiation ranges, and may be capable of changing the types of the IR lightings to be used and the number of lightings according to an environmental condition of the capturing area (for example, a case where another light source exists, a distance from the capturing target, or the like).

The lens driving control unit 21 performs the focusing processing (auto focusing processing) of changing the focal position of the lens 22 based on an execution instruction of a change relevant to the focal position of the lens acquired by the control unit 11. Therefore, since the focusing processing according to the execution instruction from the control unit 11 is performed, focusing of the lens 22, which is suitable for capturing of the capturing area, is performed, and thus deterioration of an image quality of the captured image is prevented.

Light from the capturing area is incident to the lens 22 as an example of a capturing unit and passes through the filter unit 23, and thus an image is formed on the image sensor 24 using light.

The filter unit 23 as the example of the capturing unit includes a plurality of filters (for example, an IR cut-off filter, a visible light cut-off filter, and the like), and selectively switches to one filter, through which the light from the lens 22 to passes, among the plurality of filters according to a filter switch signal from the control unit 11.

In addition, the filter unit 23 includes a plurality of cut-off filters which remove a wavelength in a prescribed wavelength region, and includes, for example, a visible light cut-off filter which removes a wavelength in a visible light region (refer to FIG. 3), an IR cut-off filter which removes a wavelength in an IR light region, and the like.

The image sensor 24 as an example of the capturing unit includes a Charge Coupled Device (CCD) or a Complementary Metal Oxide Semiconductor (CMOS) as a capturing element. The image sensor 24 may include a chip which has an image processing circuit for generating data of the captured image by performing a signal process for a well-known image process with respect to an electrical signal of a subject image corresponding to output of the capturing element. The data, which is generated by the image sensor 24, of the captured image is input to the control unit 11. In addition, the image sensor 24 may further include a gain adjustment unit which is capable of adjusting a sensitivity of the capturing element.

As above, in the camera 1, the control unit 11 outputs the execution instruction of change relevant to the focal position, the instruction including the control information for designating the focal position of the lens 22 which is suitable for capturing in the capturing area, to the lens driving control unit 21 based on the captured image data acquired from the image sensor 24. In addition, the control unit 11 outputs the filter switch signal, which includes the control information for designating a filter to be used in the filter unit 23, to the filter unit 23 based on the captured image data acquired from the image sensor 24.

The IR-LED control unit 31 as the example of the controller variably controls the value of the current to be supplied to the IR-LED 32 based on the control information which is input from the control unit 11, and adjusts the quantity of the IR light which is incident to the lens 22 and is included in the capturing area.

The IR-LED 32 as an example of an IR lighting unit is an IR lighting which irradiates the inside of the capturing area with the IR light, and is capable of adjusting the quantity of the IR light on the inside of the capturing area. In addition, the IR-LED 32 includes a plurality of IR lightings respectively having different irradiation distances, and is capable of adjusting the state of the capturing target on the inside of the capturing area, the types of the IR lightings used through the external operation, the number of IR lightings, and the quantity of light. The IR-LED 32 is an example of the IR lighting which includes the IR light, and is not limited to the LED lighting.

The PTZ control unit 41 performs each of the pan rotation of the housing, which is on the lower side than the pan rotation surface RT1, of the camera 1, and the tilt rotation of the tilt unit TLU, based on the control signal generated by the control unit 11 based on the parameters (refer to above) according to the preset positions. In addition, the PTZ control unit 41 transmits an instruction to change the zoom magnification by the lens 22 to the lens driving control unit 21 based on the control signal generated by the control unit 11 based on the parameters (refer to above description) according to the preset positions. The PTZ control is performed based on, for example, the control signal generated by the control unit 11 while using a fact that the execution instruction from a video surveillance apparatus connected through the network is input to the control unit 11 through the communication interface unit 10 as a trigger.

The power source unit 51 supplies power to the camera 1 from an external commercial power source. The power source unit 51 may directly acquire supply of the power from the external commercial power source. In addition, the power source unit 51 may include a battery, which is capable of accumulating charge supplied from the external commercial power source or may be detachable, or may be capable of supplying the power to the camera 1 even in a state in which the power source unit 51 is separated from the external commercial power source.

Figure 3:
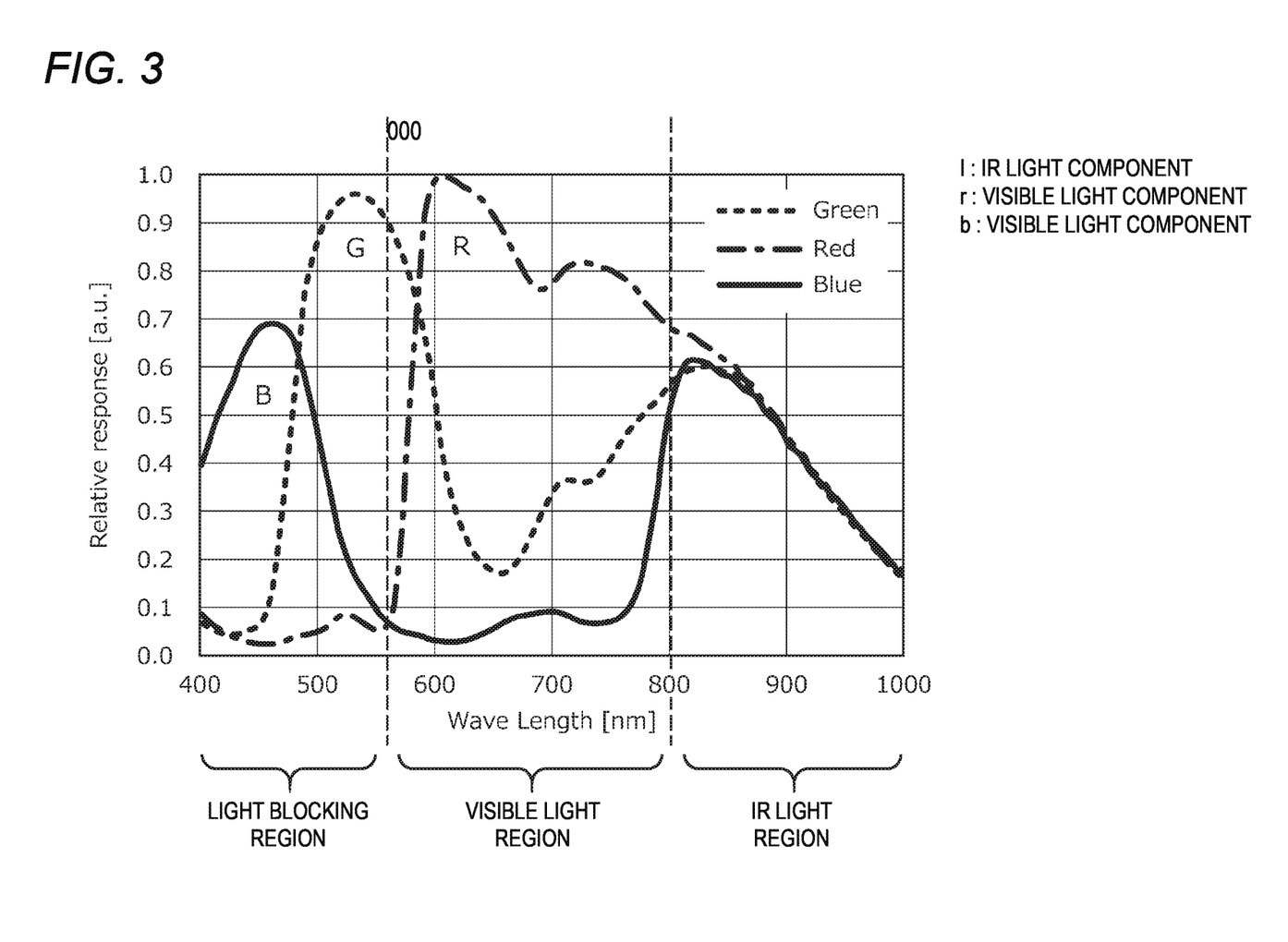
FIG. 3 is a graph illustrating examples of a photosensitivity characteristic of a lens and division performed on a wavelength region.

FIG. 3 is a graph illustrating examples of a photosensitivity characteristic of the image sensor 24 and division performed on the wavelength region.

In an RGB wavelength band of a general light, for example, a wavelength band which is larger than 800 nm is the IR light region, and a wavelength band of 400 to 800 nm is the visible light region. In FIG. 3, wavelength bands are discriminated, respectively, in such a way that, for example, a wavelength band which is equal to or smaller than 560 nm is a light blocking region by the visible light cut-off filter, a wavelength band of 560 nm to 800 nm is the visible light region, and a wavelength band which is equal to or larger than 800 nm is the IR light region. Although being described in detail later with reference to FIG. 3, a reason for this is that, in light included in the captured image which is captured by the camera 1, a red component is dominant, a blue component is almost zero in the visible light region, which is equal to or larger than 560 nm, and the quantity of the IR light (component) in light, which is included in the captured image, is approximated and acquired in a high accuracy. The wavelength bands of the blocking region, the visible light region, and the IR light region according to the present disclosure differ according to respective characteristics of the IR-LED 32 and the image sensor 24, and the wavelengths, which are boundaries of the respective wavelength bands, are not limited to 560 nm and 800 nm illustrated in FIG. 3.

Hereinafter, a method for calculating the quantities of the visible light and the IR light will be described with reference to FIG. 3. The quantities of the visible light and the IR light are calculated by the control unit 11 which includes, for example, a processor or the like. In a case where the respective quantities of the visible light and the IR light are calculated, it is assumed that the visible light, which is equal to or smaller than 560 nm corresponding to the blocking region, is removed using the visible light cut-off filter which removes the visible light. The wavelength band of the blocking region according to the present disclosure differs according to the characteristics of the IR-LED 32 and the image sensor 24, and is not limited to 560 nm.

First, in a state in which the visible light cut-off filter is turned on (that is, the visible light cut-off filter is set up by the filter unit 23), a B component of the light (for example, RGB, that is, an R component of a red color, a G component of a green color, and the B component of a blue color) from the capturing area, an image of which is formed on the image sensor 24, is expressed by a sum of a visible light component "b" and an IR light component "I", and, in the same manner, the R component is expressed by a sum of a visible light component "r" and the IR light component "I". That is, B="b"+"I" and R="r"+"I". Here, the G component of the green color is not taken into consideration.

If so, with reference to FIG. 3, it is possible to approximate the visible light component b to approximately 0, and thus, in the visible light region, the B component is acquired as B="I" and the R component is acquired as R="r"+"I". That is, with reference to FIG. 3, the B component and the R component (both of the components are "I") are approximately equivalent in the IR light region. Therefore, in a case where the B component and the R component are defined as the IR light component "I", the B component in the visible light region and the IR light region is equivalent to the IR light component "I", and it is possible to calculate the R component by adding the visible light component "r" to the IR light component "I".

Furthermore, in the R component of the red color, which most dominantly occupies the quantity of light in the light from the capturing area, the image of which is formed on the image sensor 24, as described above, the quantity of light in the visible light region is equivalent to the visible light component "r" and the quantity of light in the IR light region is equivalent to the IR light component "I". In other words, in the light from the capturing area, the image of which is formed on the image sensor 24, it is possible to calculate the quantity of light "r" in the visible light region by subtracting the B component from the R component, and the quantity of light in the IR light region is equivalent to the B component. The division performed on the wavelength band and the RGB components, illustrated in FIG. 3, are only examples, and it is apparent that the wavelength band, which differs according to the characteristics of the lens 22 and the image sensor 24, and the division, which is performed on the wavelength band, may be set.

Figure 4:
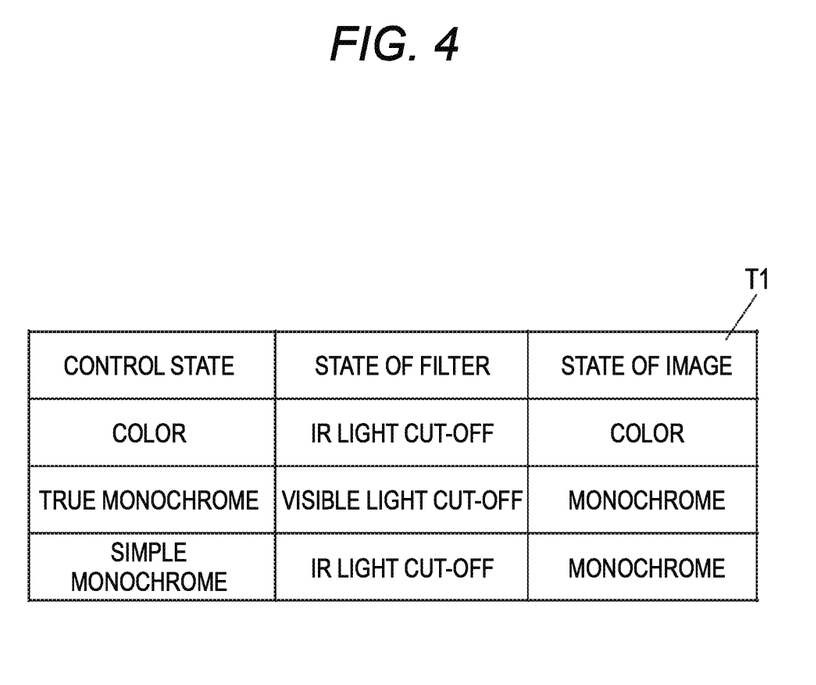
FIG. 4 is a diagram illustrating a capturing mode of a filter and a state of a captured image.

A method for controlling the filter unit 23 according to a first embodiment will be described with reference to FIG. 4. FIG. 4 is a diagram illustrating a filter, which is used in the filter unit 23 corresponding to the capturing mode, and a type of the captured image. In FIG. 4, a control state (capturing mode), a state of the filter which is used, and a state of an image (the type of the captured image) are prescribed through association.

The filter unit 23 includes at least the visible light cut-off filter and the IR cut-off filter. A color mode is a capturing mode in which it is possible to acquire a color captured image by turning on the IR cut-off filter for blocking the light in the IR light region. A true monochrome mode is a capturing mode in which it is possible to acquire a monochrome image by turning on the visible light cut-off filter for blocking light in the visible light region (for example, the wavelength band which is equal to or smaller than 560 nm illustrated in FIG. 3). A simple monochrome mode is a capturing mode in which it is possible to acquire the monochrome image by turning on the IR cut-off filter, and a monochrome image, which is darker than the monochrome image acquired in the true monochrome mode, is acquired at a point in which the IR cut-off filter is turned on.

Since the IR cut-off filter is not turned on in the true monochrome mode, the IR light is not blocked, and it is possible to acquire a large quantity of IR light included in the capturing area due to a benefit of the IR light using the IR-LED 32 as the light source (that is, the quantity of the IR light which forms an image on the image sensor 24 is large. The same hereinafter.), compared to the simple monochrome mode. Therefore, a Signal/Noise (S/N) ratio in the captured image, which is acquired in the true monochrome mode, is high. In contrast, the IR cut-off filter is turned on in the simple monochrome mode, and thus a large quantity of light in the wavelength band of the visible light forms the image on the image sensor 24. Therefore, in a case where the IR light component is small and the visible light component is large in the light included in the capturing area, it is possible to acquire a large quantity of visible light included in the captured image, compared to the true monochrome mode.

Figure 5:
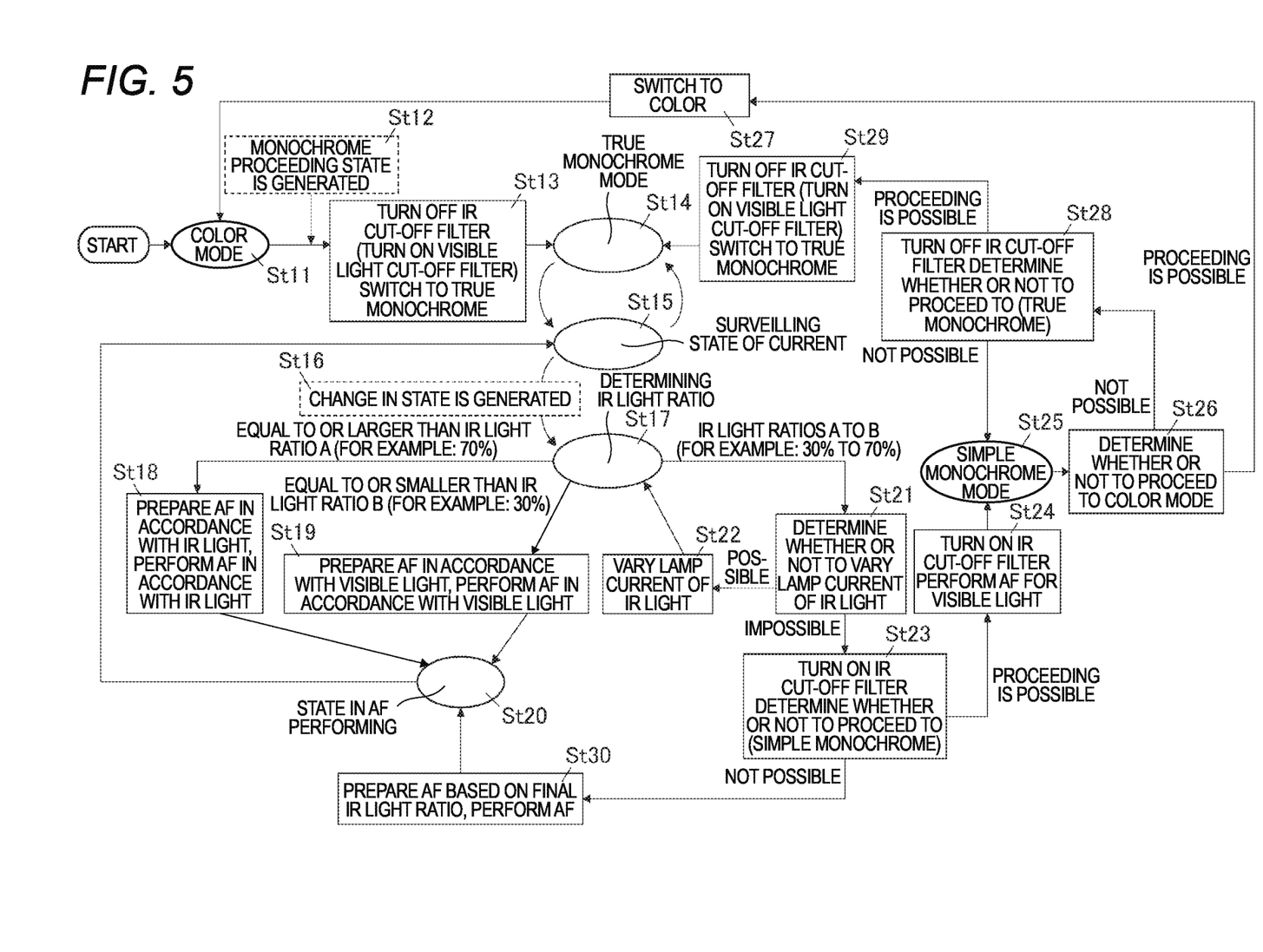
FIG. 5 is a flowchart illustrating a processing procedure performed by a control unit according to a first embodiment.

A processing procedure performed by the control unit 11 according to the first embodiment will be described with reference to FIG. 5. FIG. 5 is a flowchart illustrating the processing procedure performed by the control unit according to the first embodiment. In FIG. 5, the control unit 11 captures the capturing area in the color mode in which the IR cut-off filter is turned on (St11).

In a case where a monochrome proceeding condition is established (for example, a change in environment, in which the capturing area is sufficiently dark, or existence of an instruction, such as an external input operation, by a user), the control unit 11 determines to proceed to the true monochrome mode from the color mode (St12). In a case where the camera 1 includes an illumination sensor (not illustrated in the drawing), the control unit 11 may discriminate a situation in which the capturing area becomes dark according to a measurement value of peripheral brightness by the illumination sensor, or may discriminate a situation in which the capturing area becomes dark according to a clocking output (current time, for example, after 17:00) of a timer. The control unit 11 switches the capturing mode from the color mode to the true monochrome mode (St13) by turning off the IR cut-off filter and turning on the visible light cut-off filter. Therefore, the camera 1 easily receives the benefit of the IR light using the IR-LED 32 as the light source, and thus it is possible to acquire a large quantity of IR light included in the captured image.

In a case where the capturing mode is switched over to the true monochrome mode (St14), the control unit 11 causes the IR light is irradiated from the IR-LED 32. The control unit 11 surveils a state of a current capturing area in a state in which the IR light is irradiated from the IR-LED 32 (St15). In a case where a change in the state is generated in the capturing environment, the control unit 11 proceeds to a process of determining an IR light ratio (IR light determination processing) (St16). Here, the case where the change in the state is generated in the capturing environment includes, for example, a case immediately after switching into the true monochrome mode is performed in step St14, a case where the IR light ratio is largely varied after a prescribed auto focusing (AF) process is performed in step St20 which will be described later, a case where a PTZ operation is performed by the user, a case where the quantity of light on the inside of the capturing area is largely varied, and the like.

In a case where the process proceeds to the IR light determination processing, the control unit 11 calculates the IR light ratio which indicates the quantity of the IR light included in the captured image. Here, as being described with reference to FIG. 3, the IR light ratio indicates a ratio of the quantity of the IR light to the quantity of light from the capturing area, the image of which is formed on the image sensor 24, and, in other words, a ratio in which the IR light of the captured image is included. It is possible for the control unit 11 to appropriately adjust the IR light ratio by adjusting the quantity of current (in other words, the quantity of light of the IR-LED 32) to be supplied to the IR-LED 32 for irradiating the IR light.

For example, in a case where the IR light ratio is equal to or larger than A (as an example, 70%) (St17, equal to or larger than an IR light ratio A (for example: 70%)) based on the calculated IR light ratio, the control unit 11 determines that the IR light is sufficient in the capturing area and the IR light is dominant, performs focus adjustment using parameters preset for auto focusing in accordance with the IR light, and proceeds to a process for performing the auto focusing in accordance with the IR light (St18).

In addition, in a case where the IR light ratio is smaller than B (as an example, 30%) (St17, smaller than an IR light ratio B (for example: 30%)), the control unit 11 determines that the IR light is not sufficient in the capturing area and the visible light is dominant, performs the focus adjustment using parameters preset for the auto focusing in accordance with the visible light, and proceeds to a process for performing the auto focusing in accordance with the visible light (St19).

In contrast, in a case where the IR light ratio is equal to or larger than A and is equal to or smaller than B (A to B) (St17, IR light ratios A to B (for example: 30% to 70%)), the control unit 11 proceeds to IR light quantity adjustment determination processing for determining whether or not to vary the quantity of current to be supplied to the IR-LED 32, which is capable of adjusting the quantity of the IR light, in order to acquire the IR light ratio which enables any one of the above-described auto focusing processing for the IR light and the auto focusing processing for the visible light. Therefore, even in a case where the visible light and the IR light simultaneously exist in the same capturing area, the control unit 11 is capable of performing adaptive focus control in accordance with more dominant light, and thus it is possible to reduce the deterioration of the image quality due to focus blur.

The control unit 11 determines whether or not to vary the quantity of current to be supplied to the IR-LED 32 in order to vary the IR light ratio in the capturing area (St21). For example, the control unit 11 determines whether or not the quantity of current which is currently being supplied to the IR-LED 32 is in a fixed range of an allowable quantity of current of the IR-LED 32 in order to cause the calculated IR light ratio to approximate to the IR light ratio of any of the A (for example, equal to or larger than 70%) or B (for example, equal to or smaller than 30%). In a case where it is possible to vary the quantity of current to be supplied to the IR-LED 32 in the range of the allowable quantity of current, the control unit 11 varies the quantity of current such that a current IR light ratio becomes an IR light ratio which is close to any of A (for example, equal to or larger than 70%) or B (for example, equal to or smaller than 30%) (St22). As a result that the quantity of current is varied, the control unit 11 calculates and determines the IR light ratio of the IR light again in step St17. In a case where the IR light ratio is not the IR light ratio of any of A (for example, equal to or larger than 70%) or B (for example, equal to or smaller than 30%), the control unit 11 performs the process in step St21 again, thereby repeatedly determining whether or not to vary the quantity of current to be supplied to the IR-LED 32. In a case where it is possible to vary the quantity of current to be supplied to the IR-LED 32, the control unit 11 varies current again in step St22, and determines the IR light ratio again in step St17. Therefore, in a case where it is possible to vary the quantity of current to be supplied to the IR-LED 32 in step St21 and the IR light ratio acquired after the variation does not correspond to A (for example, equal to or larger than 70%) or B (for example, equal to or smaller than 30%), the control unit 11 continuously varies the quantity of current of the IR-LED32 (in other words, the quantity of the IR light in the capturing area). In a case where the IR light ratio corresponds to A (for example, equal to or larger than 70%) or B (for example, equal to or smaller than 30%), the control unit 11 proceeds to the process in step St18 or step St19. Therefore, in a case where the quantity of the IR light in the capturing area is varied, the camera 1 is capable of performing capturing focused to any of one light, which is more dominant, of the IR light ratio A or the IR light ratio B for performing the auto focusing processing for the visible light or the auto focusing processing for the IR light, and thus it is possible to prevent or reduce the deterioration of the image quality due to the focus blur.

The control unit 11 may determine whether or not to vary the quantity of current to be supplied to the IR-LED 32 based on the brightness (for example, a luminance value) of the captured image in step St21. Generally, in a case where the sensitivity (gain) of the capturing element is increased, the camera is capable of performing photographing even in a case where the brightness of the captured image is low (that is, dark). In contrast, the deterioration of the image quality of the captured image is easily generated. Therefore, in a case where, for example, the luminance value of the captured image is lower than a prescribed value, the control unit 11 may increase the quantity of current to be supplied to the IR-LED 32.

In contrast, in a case where it is not possible to vary the quantity of current to be supplied to the IR-LED 32 (St21, impossible), the control unit 11 determines whether or not to proceed to the simple monochrome mode by turning off the visible light cut-off filter and turning on the IR cut-off filter (St23). For example, the control unit 11 determines whether or not to proceed to the simple monochrome mode based on whether or not the IR light ratio is smaller than the prescribed lower limit value. In a case where the IR light ratio is smaller than the prescribed lower limit value, it is expected that a decrease in the quantity of the IR light due to turning on the IR cut-off filter causes at least an increase in the quantity of visible light, the control unit 11 proceeds to the simple monochrome. In contrast, in a case where the IR light ratio is higher than the prescribed lower limit value and the IR cut-off filter is turned on, the quantity of the IR light decreases, thereby becoming darker. In this case, the process of the control unit 11 proceeds to step St30.

In a case where it is possible to proceed to the simple monochrome mode (St23, proceeding is possible), the control unit 11 causes the capturing mode to proceed from the true monochrome mode to the simple monochrome mode, removes the IR light by turning off the visible light cut-off filter and turning on the IR cut-off filter, and performs the auto focusing processing for the visible light (St24). Therefore, the quantity of visible light increases by turning off the visible light cut-off filter and turning on the IR cut-off filter, and thus the control unit 11 is capable of removing the IR light in the capturing area and performing the focusing processing suitable for the visible light. Therefore, even in a case where it is not possible to select and perform any of the auto focusing processing for the IR light or the auto focusing processing for the visible light according to the calculated value of the IR light ratio, the control unit 11 is capable of acquiring the captured image, in which the visible light ratio is increased by removing the IR light, and thus it is possible to perform the auto focusing processing for the visible light.

After the control unit 11 performs the auto focusing processing for the visible light by turning off the visible light cut-off filter and turning on the IR cut-off filter, the control unit 11 switches from the true monochrome mode to the simple monochrome mode (St25).

The control unit 11 determines whether or not to proceed from the simple monochrome mode in step St25 to the color mode (St26). In a case where the inside of the capturing area becomes sufficiently bright due to, for example, light from outside (for example, light other than the IR light), such as a lighting or natural light, the control unit 11 determines that it is possible to proceed to the color mode (St26, proceeding is possible). In contrast, in a case where it is not possible to proceed, the control unit 11 determines that proceeding is not possible (St26, not possible).

In a case where it is determined that it is possible to proceed to the color mode in step St26, the control unit 11 switches from the simple monochrome mode to the color mode (St27), and performs proceeding so as to return to a state of the color mode in step St11 again. Therefore, in a case where the change in the environment, in which the capturing area becomes sufficiently dark again, or an instruction, such as the external operation or the like, by the user exists, the control unit 11 is capable of proceeding to the true monochrome mode in step St14. In addition, in a case where the camera 1 switches the capturing mode from the color mode to the true monochrome mode by turning off the IR cut-off filter and turning on the visible light cut-off filter, it is possible to acquire a large quantity of IR light included in the captured image due to the benefit of the IR light using the IR-LED 32 as the light source.

In addition, in a case where it is determined that it is not possible to proceed to the color mode, the control unit 11 determines whether or not to proceed to the true monochrome mode by turning off the IR cut-off filter (St28). In a case where it is possible to proceed to the true monochrome mode (St28, proceeding is possible), the control unit 11 switches from the simple monochrome mode to the true monochrome mode by turning off the IR cut-off filter and turning on the visible light cut-off filter (St29). Therefore, the control unit 11 is capable of acquiring the IR light of the IR-LED 32 in the capturing area again. In addition, in a case where the condition in step St16 is generated and the state in the capturing area changes, it is possible to calculate the IR light ratio and to perform the auto focusing processing according to the calculated IR light ratio. Therefore, even in the case where the visible light and the IR light simultaneously exist in the same capturing area, the camera 1 is capable of calculating the IR light ratio according to the change in the state in the capturing area and performing focus control based on the calculated IR light ratio.

In addition, in a case where, for example, the B component in the capturing area is reduced, the control unit 11 is capable of acquiring a larger quantity of IR light in a state, in which the deterioration in the quantity of visible light is small, by turning on the visible light cut-off filter and turning off the IR cut-off filter, and thus it is possible to light up the captured image.

In addition, in a case where it is not possible to proceed to the true monochrome mode (St28, not possible), the control unit 11 returns to the simple monochrome mode in step St25 while the IR cut-off filter is turned on, and determines whether or not to proceed to the color mode again (St26).

In a case where it is determined that it is not possible to proceed to the simple monochrome mode (St23, not possible), the control unit 11 calculates a final (in other words, newest) IR light ratio. Based on the finally calculated IR light ratio, the control unit 11 proceeds to a process for performing the auto focusing processing for the IR light in a case where, for example, the IR light ratio is a value which is close to A (for example, equal to or larger than 70%), and proceeds to a process for performing the auto focusing processing for the visible light in a case where the IR light ratio is close to B (for example, equal to or smaller than 30%) (St30). Therefore, even in a case where the finally calculated IR light ratio does not satisfy both conditions of A and B and light having different wavelength bands exists in the same capturing area, the camera 1 is capable of performing the focusing processing in accordance with any of dominant-side light. Therefore, compared to a case where only the focusing processing in accordance with alternative one light according to the related art is performed, the camera 1 is capable of performing the process in accordance with the more dominant-side light, and thus it is possible to reduce the focus blur which is generated in the captured image, In any of steps of the processes in above-described steps St11 to step St30, the control unit 11 is capable of returning to the color mode in step St11 in a case where the inside of the capturing area acquires the prescribed quantity of light (in other words, becomes bright and the like). Therefore, the control unit 11 is capable of reducing loads due to the respective processes or is capable of shortening time which is required for the prescribed process.

Figure 6:
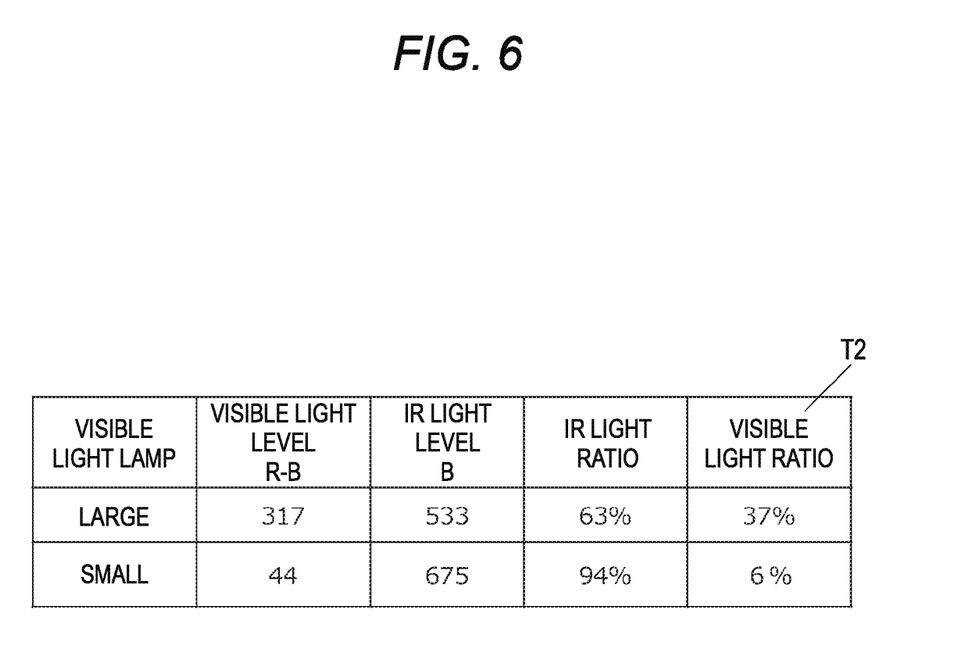
FIG. 6 is a diagram illustrating an example of calculation of a visible light ratio and an IR light ratio.

FIG. 6 is a diagram illustrating an example of calculation of the visible light ratio and the IR light ratio.

A visible light level R-B and an IR light level B in FIG. 6 will be described with reference to a drawing which illustrates examples of the characteristic of the image sensor 24 and the division of the wavelength region of FIG. 3. The visible light level R-B is the quantity of visible light and is equivalent to the visible light component "r". In addition, the IR light level B is the quantity of the IR light and is equivalent to the IR light component "I".

The visible light ratio which indicates a ratio of the visible light in the capturing area is expressed by Equation (1), and is calculated using a ratio of the quantity of light at the visible light level R-B to a whole quantity of light in the visible light region and the IR light region in the capturing area which is acquired by adding the quantity of light at the visible light level R-B to the quantity of light at the IR light level B.

$$\text{visible light ratio} = \frac{R-B}{R-B+B} \quad (1)$$

In contrast, the IR light ratio which indicates a ratio of the visible light in the capturing area is expressed by Equation (2), and is calculated using a ratio of the quantity of light at the IR light level B to the whole quantity of light in the visible light region and the IR light region in the capturing area which is acquired by adding the quantity of light at the visible light level R-B to the quantity of light at the IR light level B.

$$IR \text{ light ratio} = \frac{B}{R-B+B} \quad (2)$$

The camera apparatus according to the first embodiment includes the capturing unit that includes the lens 22 to which the light from the capturing area including the IR light and the visible light is incident and that performs capturing based on the light from the capturing area in which an image is formed by the lens 22, and the IR-LED 32 that irradiates the capturing area with the IR light. The control unit 11 generates an instruction to change the focal position of the lens 22 and an instruction to adjust the quantity of the IR light. In addition, the control unit 11 calculates the IR light ratio which indicates the ratio of the quantity of the IR light to the light, from the capturing area, included in the captured image of the capturing area. For example, in a case where the IR light ratio is equal to or larger than A (as an example, 70%), the control unit 11 determines that the IR light is sufficient in the capturing area and the IR light is dominant, performs the focus adjustment using parameters previously set for the auto focusing in accordance with the IR light, and proceeds to the process of performing the auto focusing in accordance with the IR light, based on the calculated IR light ratio. In addition, in a case where the IR light ratio is equal to or smaller than B (as an example, 30%), the control unit 11 determines that the IR light is not sufficient in the capturing area and the visible light is dominant, performs the focus adjustment using parameters previously set for the auto focusing in accordance with the visible light, and proceeds to the process of performing the auto focusing in accordance with the visible light, based on the calculated IR light ratio. In contrast, in a case where the IR light ratio is equal to or smaller than A and is equal to or larger than B (A to B), the control unit 11 proceeds to the IR light quantity adjustment determination processing for determining whether or not to vary the quantity of current to be supplied to the IR-LED 32, which is capable of adjusting the quantity of the IR light, in order to acquire the IR light ratio at which it is possible to perform any one of the above-described auto focusing processing for the IR light and the auto focusing processing for the visible light.

Therefore, in a case where the quantity of the IR light in the capturing area is varied, the camera 1 is capable of performing capturing focused to any of one light, which is more dominant, of the IR light ratio A or the IR light ratio B for performing the auto focusing processing for the visible light or the auto focusing processing for the IR light, and thus it is possible to prevent or reduce the deterioration of the image quality due to the focus blur. Furthermore, even in a case where IR light ratio is included in A to B, the control unit 11 is capable of adjusting an adaptive IR light ratio by determining whether or not to adjust the quantity of current of the IR-LED 32, and thus it is possible to prevent the deterioration of the image quality generated in a case where the focusing processing in accordance with alternative one light according to the related art is performed.

In addition, in the camera apparatus and the capturing control method of the camera apparatus, the control unit 11 calculates the IR light ratio which indicates the quantity of the IR light included in the captured image in a case where the control unit 11 proceeds to the IR light determination processing. The control unit 11 appropriately adjusts the IR light ratio by adjusting the quantity of current to be supplied to the IR-LED 32 (in other words, the quantity of light of the IR-LED 32) according to the calculated IR light ratio. Furthermore, the control unit 11 determines the IR light ratio again. Therefore, in a case where the quantity of the IR light in the capturing area is varied, the camera 1 is capable of performing capturing focused to any of one light, which is more dominant, of the IR light ratio A or the IR light ratio B for performing the auto focusing processing for the visible light or the auto focusing processing for the IR light, and thus it is possible to prevent or reduce the deterioration of the image quality due to the focus blur.

In addition, in the camera apparatus and the capturing control method of the camera apparatus, the control unit 11 calculates the IR light ratio which indicates the quantity of the IR light included in the captured image in a case of proceeding to the IR light determination processing. The control unit 11 appropriately adjusts the IR light ratio by adjusting the quantity of current to be supplied to the IR-LED 32 (in other words, the quantity of light of the IR-LED 32) according to the calculated IR light ratio. In addition, the control unit 11 calculates the IR light ratio of the IR light again after adjusting the quantity of current. In a case where the calculated IR light ratio is equal to or smaller than A and is equal to or larger than B (A to B), the control unit 11 proceeds to the IR light determination processing again, and performs a process of adjusting the quantity of current to be supplied to the IR-LED 32. The control unit 11 repeats the processes until the IR light ratio is equal to or larger than A and is equal to or smaller than B. Therefore, in a case where the quantity of the IR light in the capturing area is varied, the camera 1 is capable of performing capturing focused to any of one light, which is more dominant, of the IR light ratio A or the IR light ratio B for performing the auto focusing processing for the visible light or the auto focusing processing for the IR light, and thus it is possible to prevent or reduce the deterioration of the image quality due to the focus blur.

In addition, in the camera apparatus and the capturing control method of the camera apparatus, in a case where it is not possible to vary the quantity of current to be supplied to the IR-LED 32, the control unit 11 determines whether or not to proceed to the simple monochrome mode by turning off the visible light cut-off filter and turning on the IR cut-off filter. In a case where it is possible to proceed to the simple monochrome mode, the control unit 11 causes the capturing mode to proceed from the true monochrome mode to the simple monochrome mode, removes the IR light by turning off the visible light cut-off filter and turning on the IR cut-off filter, and performs the auto focusing processing for the visible light. Therefore, the quantity of visible light increases by turning off the visible light cut-off filter and turning on the IR cut-off filter, and thus the control unit 11 is capable of removing the IR light in the capturing area and performing the focusing processing suitable for the visible light. Therefore, the control unit 11 is capable of acquiring the captured image, in which the IR light is removed and the visible light ratio is increased, even in a case where it is not possible to select and perform any of the auto focusing processing for the IR light or the auto focusing processing for the visible light according to the value of the calculated IR light ratio, and thus it is possible to perform the auto focusing processing for the visible light.

In addition, in the camera apparatus and the capturing control method of the camera apparatus, in a case where it is not possible to vary the quantity of current to be supplied to the IR-LED 32, the control unit 11 calculates the final (in other words, the newest) IR light ratio. Based on the finally calculated IR light ratio, the control unit 11 proceeds to a process of performing the auto focusing processing for the IR light in a case where, for example, the IR light ratio is a value close to A (for example, equal to or larger than 70%), or proceeds to a process of performing the auto focusing processing for the visible light in a case where the IR light ratio is close to B (for example, equal to or smaller than 30%). Therefore, even in a case where the finally calculated IR light ratio does not satisfy both conditions of A and B and light having different wavelength bands exists in the same capturing area, the camera 1 is capable of performing the focusing processing in accordance with any of dominant-side light. Therefore, compared to the case where only the focusing processing in accordance with alternative one light according to the related art is performed, the camera 1 is capable of performing the process in accordance with the more dominant-side light, and thus it is possible to reduce the focus blur which is generated in the captured image.

In addition, in the camera apparatus and the capturing control method of the camera apparatus, the control unit 11 determines whether or not to proceed from the simple monochrome mode to the color mode. In a case where the inside of the capturing area becomes sufficiently bright due to, for example, the light from outside (for example, the light other than the IR light), such as the lighting or the natural light, the control unit 11 determines that it is possible to proceed to the color mode, and switches to the color mode. Therefore, in the case where the change in the environment, in which the capturing area becomes sufficiently dark again, or the instruction, such as the external operation or the like, by the user exists, the control unit 11 is capable of easily perform conversion into the true monochrome mode.

In addition, in the camera apparatus and the capturing control method of the camera apparatus, in a case where it is possible to proceed to the true monochrome mode, the control unit 11 switches from the simple monochrome mode to the true monochrome mode by turning off the IR cut-off filter and turning on the visible light cut-off filter. Therefore, the control unit 11 is capable of acquiring the IR light of the IR-LED 32 in the capturing area again. In addition, in a case where the state in the capturing area is changed, the control unit 11 calculates the IR light ratio, and thus it is possible to perform the auto focusing processing according to the calculated IR light ratio. Therefore, for example, in a case where the B component in the capturing area becomes small, the control unit 11 is capable of acquiring a large quantity of IR light in a state in which the deterioration of the quantity of visible light is small by turning off the IR cut-off filter and turning on the visible light cut-off filter, and thus it is possible to light up the captured image. In addition, in the case where the change in the environment, in which the capturing area becomes sufficiently dark again, or the instruction, such as the external operation or the like by the user, exists, the control unit 11 is capable of easily performing conversion into the true monochrome mode.

In addition, in the camera apparatus and the capturing control method of the camera apparatus, the control unit 11 is capable of appropriately adjusting the IR light ratio by adjusting the quantity of current (in other words, the quantity of light of the IR-LED 32) to be supplied to the IR-LED 32 for irradiating the IR light. Therefore, the control unit 11 is capable of adjusting the quantity of the IR light (in other words, the IR light ratio) included in the capturing area.

Hereinabove, although the embodiment is described with reference to the accompanying drawings, the present disclosure is not limited to the examples. It is apparent that those skilled in the art can conceive of various changes, modifications, replacements, additions, removals, and equivalents in categories disclosed in claims, and it is understood that the changes, modifications, replacements, additions, removals, and equivalents belong to the technical scope of the present disclosure. In addition, the respective components according to the above-described embodiment may be randomly combined with each other without departing from the gist of the present disclosure.

The present disclosure is useful as the camera apparatus and the capturing control method of the camera apparatus which are capable of maintaining stable image qualities by preventing the deterioration of the image quality due to the focus blur even in the case where the visible light and the IR light simultaneously exist in the same scene.

What is claimed is:
1. A camera apparatus comprising:
   a capturing unit that includes a lens to which light, from
     a capturing area including IR light and visible light, is
     incident, and that performs capturing based on the
     light;

an IR light emitter that irradiates the capturing area with the IR light; and a controller that generates an instruction to change a focal position of the lens and an instruction to adjust a quantity of the IR light, wherein the controller calculates an IR light ratio which indicates a ratio of the quantity of the IR light to the light included in a captured image of the capturing area, selects and performs either any one or a combination from the group consisting of a first focusing processing to change the focal position of the lens corresponding to the IR light, a second focusing processing to change the focal position of the lens corresponding to the visible light, and an IR light quantity adjustment determination processing to determine whether or not to adjust the quantity of the IR light, based on the IR light ratio, and adjusts the quantity of the IR light and re-calculates the IR light ratio according to a determination that it is possible to increase or decrease the quantity of the IR light in a case where the IR light quantity adjustment determination processing is selected.

2. The camera apparatus according to claim 1, wherein, in the IR light quantity adjustment determination processing, the controller repeatedly adjusts the quantity of the IR light up to the IR light ratio at which either one of the first focusing processing and the second focusing processing is performable.

3. The camera apparatus according to claim 1, further comprising:

a filter that performs switching between on and off of an IR cut-off filter which removes the IR light, from the light from the capturing area, wherein, in a case where it is not possible to adjust the quantity of the IR light, the controller determines whether or not to proceed to a first monochrome mode for preparing a monochrome captured image by turning on the IR cut-off filter, and the controller performs the second focusing processing according to a determination that it is possible to proceed to the first monochrome mode.

4. The camera apparatus according to claim 1, wherein, in a case where it is not possible to adjust the quantity of the IR light, the controller selects and performs either one of the first focusing processing and the second focusing processing based on a newest IR light ratio.

5. The camera apparatus according to claim 3, wherein the controller determines whether or not to proceed to a color mode for preparing a color captured image in a case of the first monochrome mode, and switches to the color mode while turning on the IR cut-off filter in a case where it is determined that it is possible to proceed to the color mode.

6. The camera apparatus according to claim 3, wherein the controller determines whether or not to proceed to a second monochrome mode for preparing the monochrome captured image by turning off the IR cut-off filter in a case of the first monochrome mode, and switches to the second monochrome mode in a case where it is determined that it is possible to proceed to the second monochrome mode.

7. The camera apparatus according to claim 1, wherein, in a case where the quantity of the IR light is adjusted, the controller adjusts current to be supplied to the IR light for increasing or reducing the quantity of the IR light.

8. A capturing control method implemented by a camera apparatus having a lens to which light, from a capturing area including IR light and visible light, is incident, the method comprising:

irradiating the capturing area with the IR light;

performing capturing based on the light;

calculating an IR light ratio which indicates a ratio of a quantity of the IR light to the light included in a captured image of the capturing area;

selecting and performing either any one or a combination from the group consisting of a first focusing processing to change a focal position of the lens corresponding to the IR light, a second focusing processing to change the focal position of the lens corresponding to the visible light, and an IR light quantity adjustment determination processing to determine whether or not to adjust the quantity of the IR light, based on the IR light ratio; and adjusting the quantity of the IR light and re-calculating the IR light ratio according to a determination that it is possible to increase or decrease the quantity of the IR light in a case where the IR light quantity adjustment determination processing is selected.

* * * * *